(12) United States Patent
Sureka

(10) Patent No.: US 7,801,836 B2
(45) Date of Patent: Sep. 21, 2010

(54) AUTOMATED PREDICTIVE DATA MINING MODEL SELECTION USING A GENETIC ALGORITHM

(75) Inventor: Ashish Sureka, Karnataka (IN)

(73) Assignee: Infosys Technologies Ltd., Bangalore (IN)

( * ) Notice: Subject to any disclaimer, the term of this patent is extended or adjusted under 35 U.S.C. 154(b) by 496 days.

(21) Appl. No.: 11/862,147

(22) Filed: Sep. 26, 2007

(65) Prior Publication Data

US 2008/0077544 A1    Mar. 27, 2008

(30) Foreign Application Priority Data

Sep. 28, 2006    (IN)    .................... 1792/CHE/2006

(51) Int. Cl.
*G06F 15/18* (2006.01)
(52) U.S. Cl. ........................................ 706/13; 707/776
(58) Field of Classification Search ................... 706/13, 706/45–47; 707/776
See application file for complete search history.

(56) References Cited

U.S. PATENT DOCUMENTS

| | | | |
|---|---|---|---|
| 5,692,107 A * | 11/1997 | Simoudis et al. .............. | 706/12 |
| 5,893,069 A | 4/1999 | White, Jr. | |
| 6,879,971 B1 | 4/2005 | Keeler et al. | |
| 6,954,758 B1 | 10/2005 | O'Flaherty | |
| 2002/0138492 A1* | 9/2002 | Kil .............................. | 707/100 |
| 2003/0041042 A1* | 2/2003 | Cohen et al. .................. | 706/45 |
| 2003/0088565 A1 | 5/2003 | Walter et al. | |
| 2003/0176931 A1 | 9/2003 | Pednault et al. | |
| 2004/0172374 A1* | 9/2004 | Forman ........................ | 706/12 |
| 2005/0091147 A1 | 4/2005 | Ingargiola et al. | |
| 2005/0102303 A1 | 5/2005 | Russell et al. | |
| 2005/0114360 A1 | 5/2005 | Russell et al. | |
| 2005/0114377 A1 | 5/2005 | Russell et al. | |
| 2005/0195966 A1 | 9/2005 | Adar et al. | |
| 2005/0234688 A1 | 10/2005 | Pinto et al. | |
| 2008/0010258 A1 | 1/2008 | Sureka | |

FOREIGN PATENT DOCUMENTS

| | | |
|---|---|---|
| EP | 1050833 A2 | 11/2000 |
| EP | 1107157 A2 | 6/2001 |
| EP | 1107157 A3 | 11/2001 |

OTHER PUBLICATIONS

Minerva et al., Building ARMA Models with Genetic Algorithms, 2001, E.J.W. Boers et al. (Eds.) EvoWorkshop , LNCS 2037, pp. 335-342.*

Grossman et al., The management and mining of multiple predictive models using the predictive model markup language, 1999, Elsevier Science, pp. 1-7.*

(Continued)

*Primary Examiner*—David R Vincent
(74) *Attorney, Agent, or Firm*—Klarquist Sparkman, LLP

(57) ABSTRACT

A predictive data mining model can be selected based on how well the model meets an objective function. In certain implementations genetic algorithms can be used to search a space of predictive data mining model building parameters to determine an optimal predictive data mining model based on a score function corresponding to, for example, the accuracy of the selected predictive data mining model.

21 Claims, 19 Drawing Sheets

OTHER PUBLICATIONS

Glymour et al., Statisical Themes and Lessons for Data Mining, 1997, Data Mining and Knowledge Discovery 1, 11-28, pp. 1-18.*

Sureka et al., Using Genetic Algorithms for parameter optimizing in building predictive data mining models, 2008, Springer-Verlag Berlin Heidelberg, pp. 260-271.*

Back, "Selective Pressure in Evolutionary Algorithms: A Characterization of Selection Mechanisms," *In Proceedings of the First IEEE Conference on Evolutionary Computation.* IEEE World Congress on Computational Intelligence (WCCI) 1994, 6 pages.

Cohen, "Fast Effective Rule Induction," *Machine Learning: Proceedings of the Twelfth International Conference,* 1995, 10 pages.

"Data Mining," Wikipedia, visited Sep. 25, 2007, 8 pages.

Dietterich "Approximate Statistical Tests for Comparing Supervised Classification Learning Algorithms," *Neural Computation,* vol. 10, Issue 7, 1998, pp. 1895-1923, 29 pages.

"Genetic algorithm," Wikipedia, visited Sep. 24, 2007, 13 pages.

Goldberg et al., "A Comparative Analysis of Selection Scheme used in Genetic Algorithms," In Foundations of Genetic Algorithms, G. Rawlings, Editor, San Mateo, CA: Morgan Kaufman, 1991, 27 pages.

Holmes et al., "WEKA: A Machine Learning Workbench," *Intelligent Information Systems, 1994. Proceedings of the 1994 Second Australian and New Zealand Conference,* 1994, 5 pages.

Kalousis et al., "NOEMON: Design, Implementation and Performance Results of an Intelligent Assistant for Classifier Selection," *Intelligent Data Analysis,* 3(5), Nov. 1999, pp. 319-337, 15 pages.

King et al., "STATLOG: Comparison of Classification Algorithms on Large Real-World Problems," *Applied Artificial Intelligence,* 9(3), May/Jun. 1995, 70 pages.

Liu et al., "A Probabilistic Approach to Feature Selection—A Filter Solution," $13^{th}$ *International Conference on Machine Learning (ICML)* Bari, Italy, 1996, pp. 319-327, 9 pages.

Quinlan "Induction of Decision Trees," *Machine Learning,* vol. 1, pp. 81-106, 1986, 26 pages.

Sureka, "Making Unstructured Data Findable Using Tagging and Annotation," *DM Direct Special Report,* May 9, 2006, 4 pages.

Sureka, "Using Genetic Algorithms for Parameter Optimization in Building Predictive Data Mining Models," Software Engineering and Technology Labs (SETLabs), Sep. 21, 2007, 12 pages.

"Tabu Search," Wikipedia, 25, 2007, 3 pages.

Vafaie et al., "Robust Feature Selection Algorithms," *In Proceedings of the $5^{th}$ IEEE International Conference on Tools for Artificial Intelligence,* Boston, MA, 1993, pp. 356-363, 8 pages.

"Weka (machine learning)," Wikipedia, 2007, 3 pages.

* cited by examiner

US 7,801,836 B2

AUTOMATED PREDICTIVE DATA MINING MODEL SELECTION USING A GENETIC ALGORITHM

BACKGROUND

Predictive data mining modeling techniques generally include building a classification or regression model that can accurately predict values by observing the values of input attributes. Finding an optimal algorithm and its control parameters for building a predictive data mining model is difficult for various reasons. For example, there are many possible classification algorithms and associated control parameters. Also, it is very time consuming to build a model for datasets containing a large number of records and attributes. These two reasons, among various others, make it impractical to find an optimal model by enumerating through a large number of algorithms and their possible control parameters. Thus, there remains room for improvement in current predictive data mining modeling techniques.

SUMMARY

A variety of techniques can be used for automated predictive data mining model selection. Automated techniques can make the technologies available to more users without need for expertise in the field of predictive data mining models.

As described herein, a variety of other features and advantages can be incorporated into the technologies as desired.

The foregoing and other features and advantages will become more apparent from the following detailed description of disclosed embodiments, which proceeds with reference to the accompanying drawings.

DETAILED DESCRIPTION

Example 1

Exemplary System Employing a Combination of the Technologies

Figure 1:
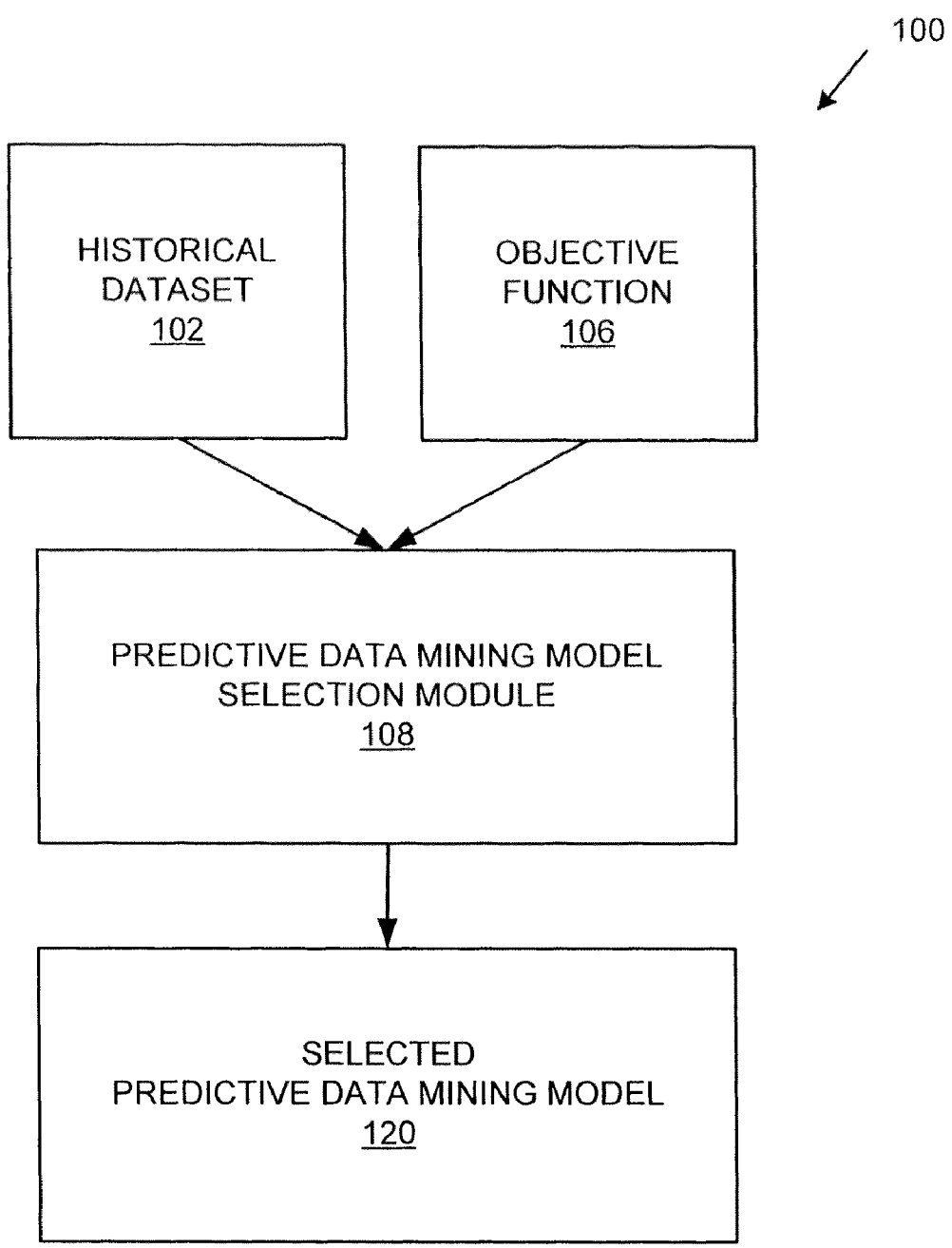
FIG. 1 is a block diagram of an exemplary automated predictive data mining model selection system.

FIG. 1 is a block diagram of an exemplary predictive data mining model selection system 110. The system 100 and variants of it can be used to perform any of the methods described herein.

In the example, an historical dataset 102 and an objective function 106 are received by (e.g., provided as inputs to) a predictive data mining model selection module 108. The predictive data mining model selection module 108 builds and analyzes a plurality of predictive data mining models. Such models can be chosen for evaluation by software as described herein. The predictive data mining model selection module 108 also outputs an indication of a selected predictive data mining model 120.

In practice, the system 100 can be more complicated, with additional inputs, outputs, and the like.

Example 2

Exemplary Method of Predictive Data Mining Modeling

Figure 2:
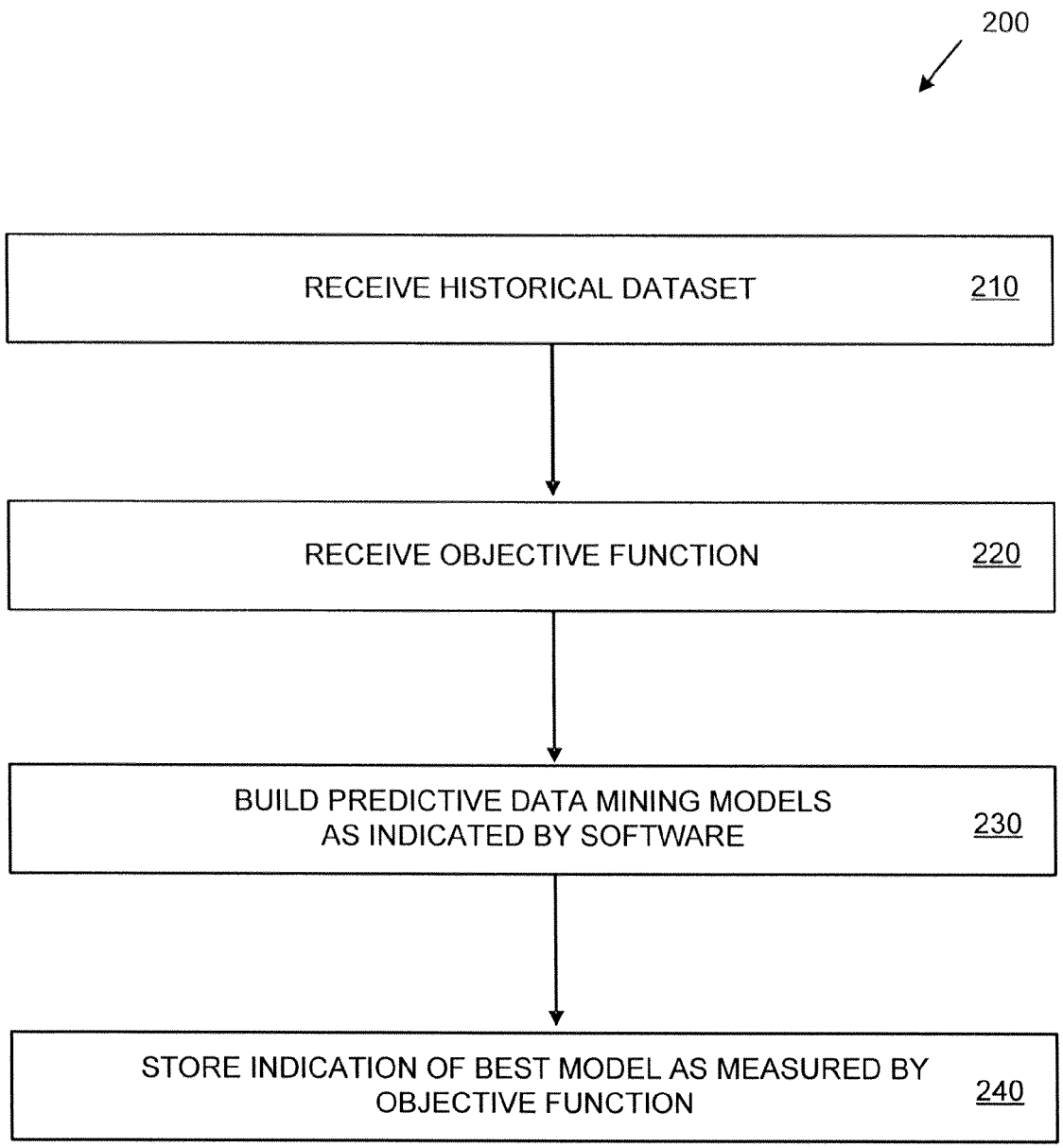
FIG. 2 is a flowchart of an exemplary method of selecting a predictive data mining model by software.

FIG. 2 is a flowchart 200 of an exemplary method of selecting a predictive data mining model by software and can be used in any of the examples herein.

At 210, an historical dataset is received. At 220, an objective function is received.

At 230, a plurality of predictive data mining models are built as indicated by software. The software can indicate (e.g., choose) which predictive data mining models are to be built.

At 240, an indication of the best model, as measured by the objective function, can be stored. In this way, the selected (e.g. optimal) predictive data mining model can be indicated by the software.

Example 3

Exemplary Template Transformation

Figure 3:
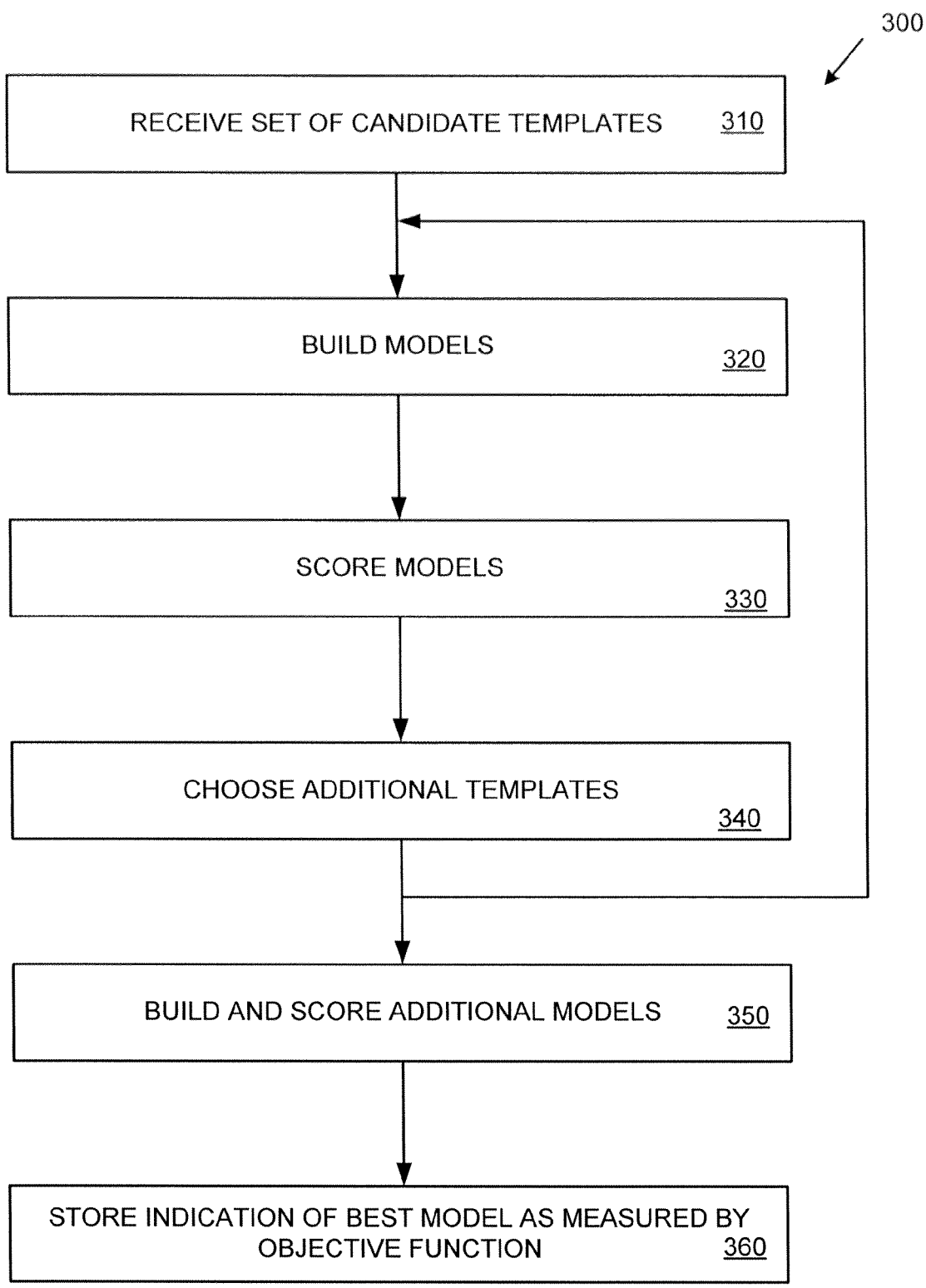
FIG. 3 is a flowchart of an exemplary method of selecting a predictive data mining model by software via repeated transformation of a test of templates.

FIG. 3 is a flowchart of an exemplary method 300 of selecting a predictive data mining model by software via repeated transformation of a test of templates.

At 310, a set of candidate predictive data mining model templates is received.

At 320, 330, and 340, the set of candidate predictive data mining model templates are repeatedly transformed. Transforming can comprise building predictive data mining models based on templates in the set and historical data at 320, scoring the predictive data mining models based on test data and an objective function at 330, and choosing, by software, based on the scoring, additional candidate predictive data mining model templates for inclusion in the set based on scoring results at 340. As described herein, transformation can be achieved via application of a genetic algorithm.

At 350, additional models based on the additional templates can be built and scored.

At 360, an indication of the best model (e.g., a built and scored model best meeting the objective function) can be stored. The indication can indicate the template or the model itself.

Example 4

Exemplary Predictive Data Mining Model

Figure 4:
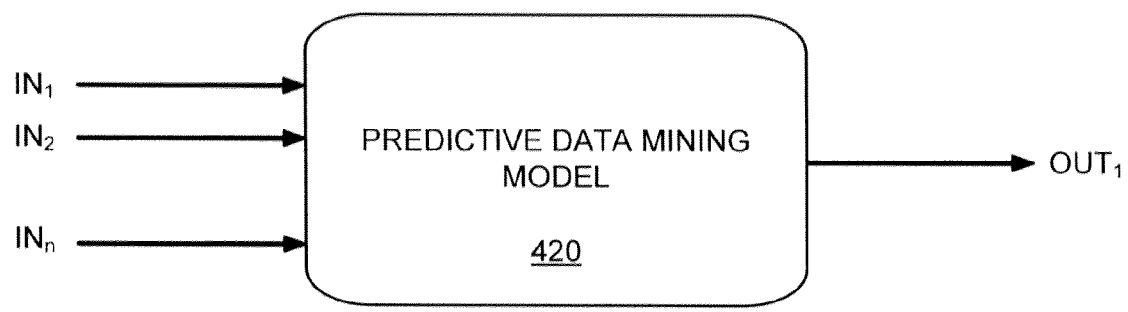
FIG. 4 is a block diagram of an exemplary predictive data mining model.

FIG. 4 is a block diagram of an exemplary predictive data mining model 420 that can be used in any of the examples herein. In the example, the model 420 accepts a plurality of inputs (e.g., $IN_1$, $IN_2$, $IN_n$) and generates an output (e.g., $OUT_1$). The predictive data mining model 420 can take any of a variety of forms and can be built by any of a variety of learning methods. Various possible forms and learning methods are described herein. Further, various parameters can be modified for the model 420 before, during, or after construction.

The model 420 can be implemented as a classifier (e.g., outputting a classification), a regression model (e.g., outputting a value, such as a continuous variable), or the like.

As described herein, the model 420 can be constructed with historical data and then asked to provide a prediction for new data. Inputs (e.g., sometimes called independent variables, predictors, or the like), are used by the model 420 to derive an output. Sometimes the output is called the "target" or "class" variable.

Example 5

Exemplary Prediction Method

Figure 5:
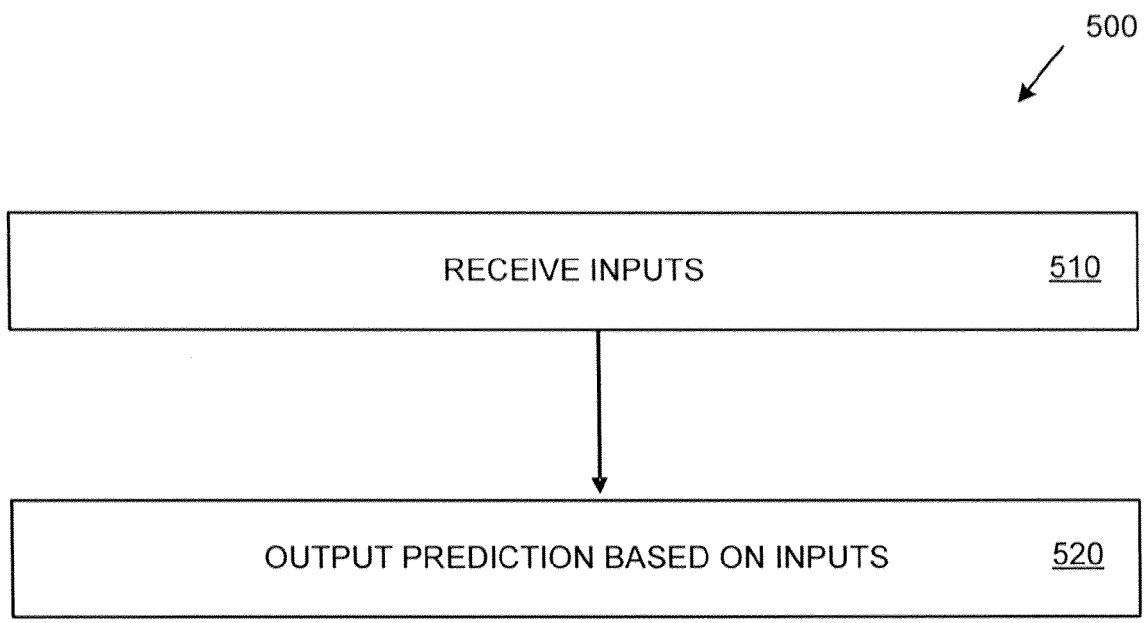
FIG. 5 is a flowchart of an exemplary method of generating a prediction with a predictive data mining model.

FIG. 5 is a flowchart of an exemplary method 500 of generating a prediction with a predictive data mining model, such as that shown in FIG. 4. At 510, inputs are received. At 520, a prediction is output based on the inputs. The prediction can be generated in light of historical data by which the model has learned how to predict an appropriate output value.

Example 6

Exemplary Predictive Data Mining Model Building System

Figure 6:
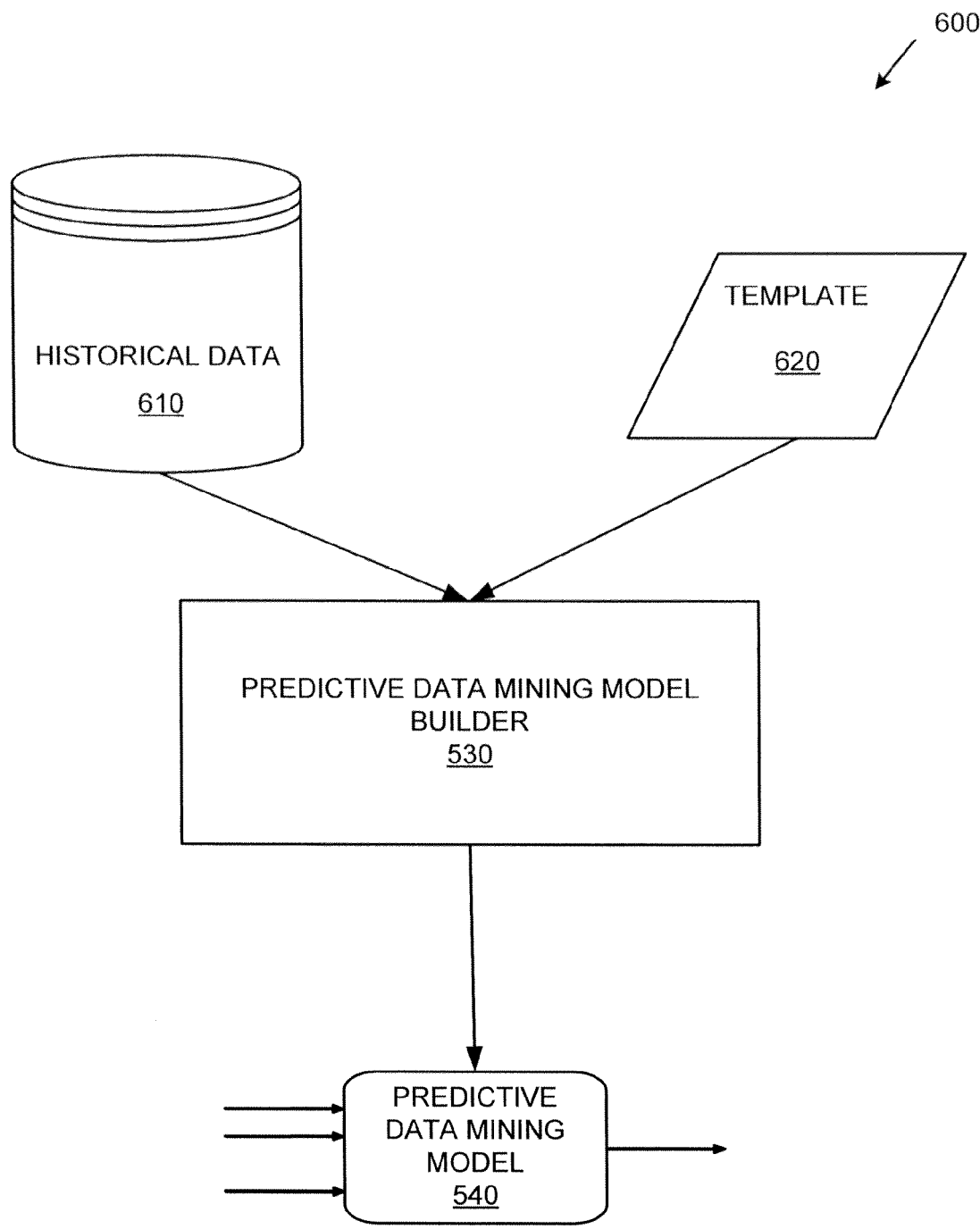
FIG. 6 is a block diagram of an exemplary predictive data mining model building system.

FIG. 6 is a block diagram of an exemplary predictive data mining model building system 600. In the example, a predictive data mining model builder 630 uses the historical data 610 and the predictive data mining model template 620 to build a predictive data mining model 640.

The template 620 can indicate the characteristics of the model before it is built, and the historical data 610 can be used to build (e.g., train, etc.) the model 640.

As described herein, the model 640 can then be scored to determine how well it meets an objective function.

Example 7

Exemplary Method of Building a Predictive Data Mining Model

Figure 7:
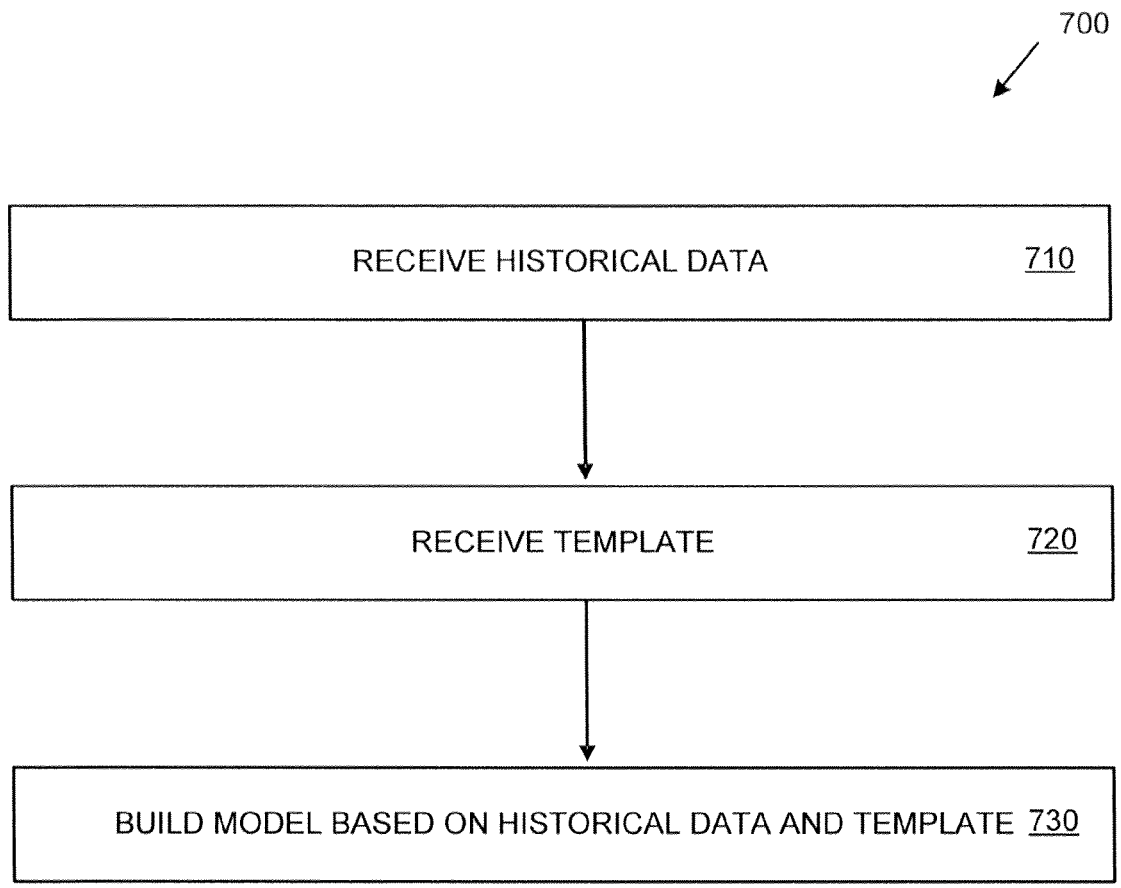
FIG. 7 is a flowchart of an exemplary method of building a predictive data mining model via a template.

FIG. 7 is a flowchart of an exemplary method 700 of building a predictive data mining model via a template. At 710, historical data is received. At 720, a predictive data mining model template is received.

At 730, a model is built based on the historical data and the template.

Example 8

Exemplary Predictive Data Mining Model Template

Figure 8:
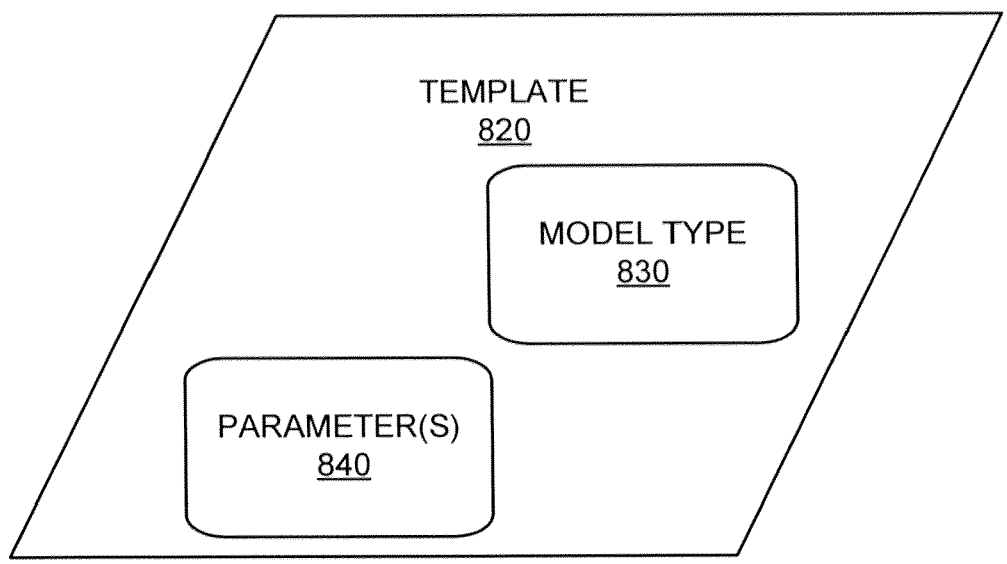
FIG. 8 is a block diagram of an exemplary predictive data mining model template.

FIG. 8 is a block diagram of an exemplary predictive data mining model template 820 and can be used in any of the examples herein to represent characteristics of a predictive data mining model (e.g., before it is built with historical data).

Exemplary characteristics that can be stored (e.g., represented) by the template 820 include an indication of model type 830 (e.g., classifier type or the like) and parameters 840 (e.g., parameters appropriate for the indicated model type). An indication of a learning scheme can also be stored. Parameters can include control options or tuning parameters that determine how the resulting model will be built, how the resulting model will process input, and the like.

The template can represent characteristics of predictive data mining model by indicating one out of a plurality of characteristic values for a plurality of characteristic types. In practice, such values can be selected from a set of options (e.g., various learning schemes, TRUE/FALSE values, or the like), listed as scalars, or otherwise indicated.

As described herein, the characteristics can be indicated via a stored digital chromosome to facilitate processing by a genetic algorithm technique. Thus, the template itself can take the form of a stored digital chromosome. A model builder can interpret the characteristics to build a model as appropriate, based on the characteristics indicated by the template.

Example 9

Exemplary Storage of Model Characteristics

Figure 9:
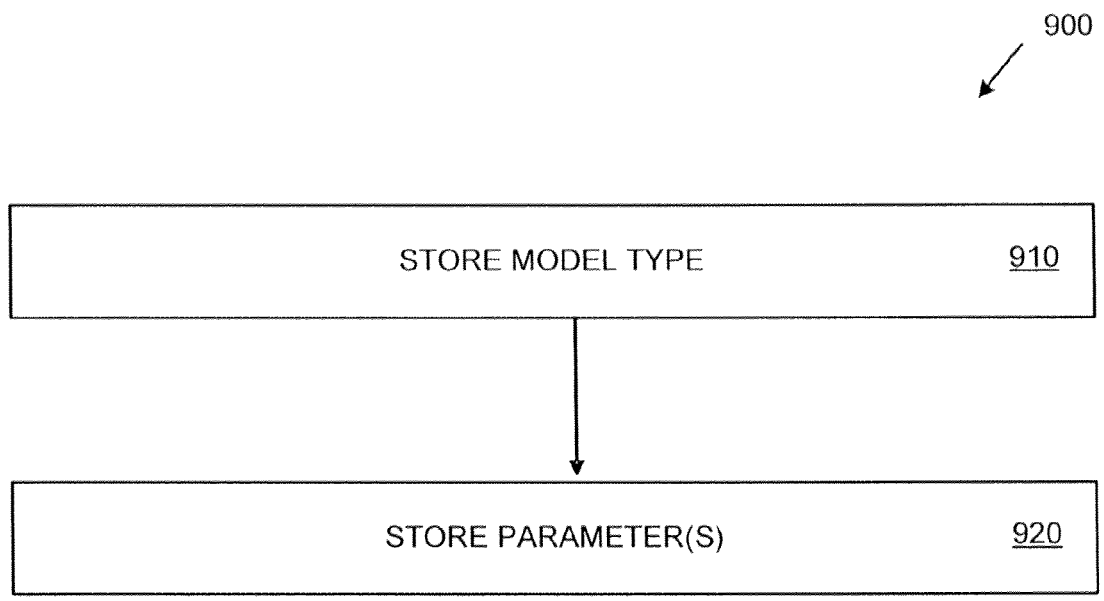
FIG. 9 is a flowchart of an exemplary method of storing characteristics of a predictive data mining model.

FIG. 9 is a flowchart of an exemplary method of storing characteristics of a predictive data mining model and can be achieved via the template mechanism described herein.

At 900, a model type for the model to be built is stored. For example, a classifier type can be stored.

At 910, one or more parameters for the model are stored. The parameters can control how the model is built, how it accepts inputs, and the like.

Example 10

Exemplary Transformation of a Set of Predictive Data Mining Model Templates

Figure 10:
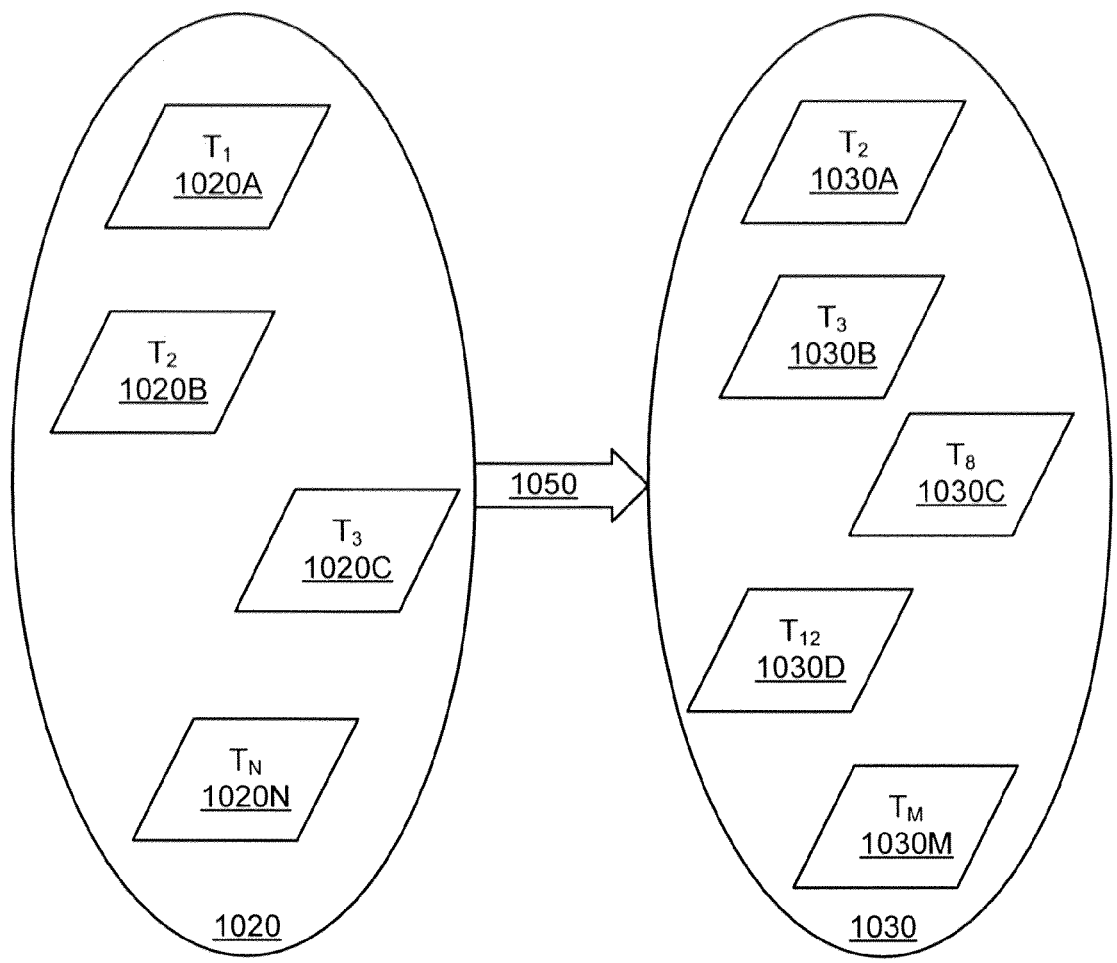
FIG. 10 is a block diagram of an exemplary transformation of a set of predictive data mining model templates.

FIG. 10 is a block diagram of an exemplary transformation of a set of predictive data mining model templates. In the example, a set 1020 of templates (e.g., 1020A-N) are transformed into a resulting set 1030 of templates (e.g., 1030A-M) by a transformation function 1050.

A shown, it is possible that some templates pass through the transformation unchanged. Other templates may be removed during the transformation. One or more new templates can be added.

As described herein, a genetic algorithm can be used to implement the transformation function 1050, in light of how well models built for the templates in the source set 1020 meet an objective function.

Example 11

Figure 11:
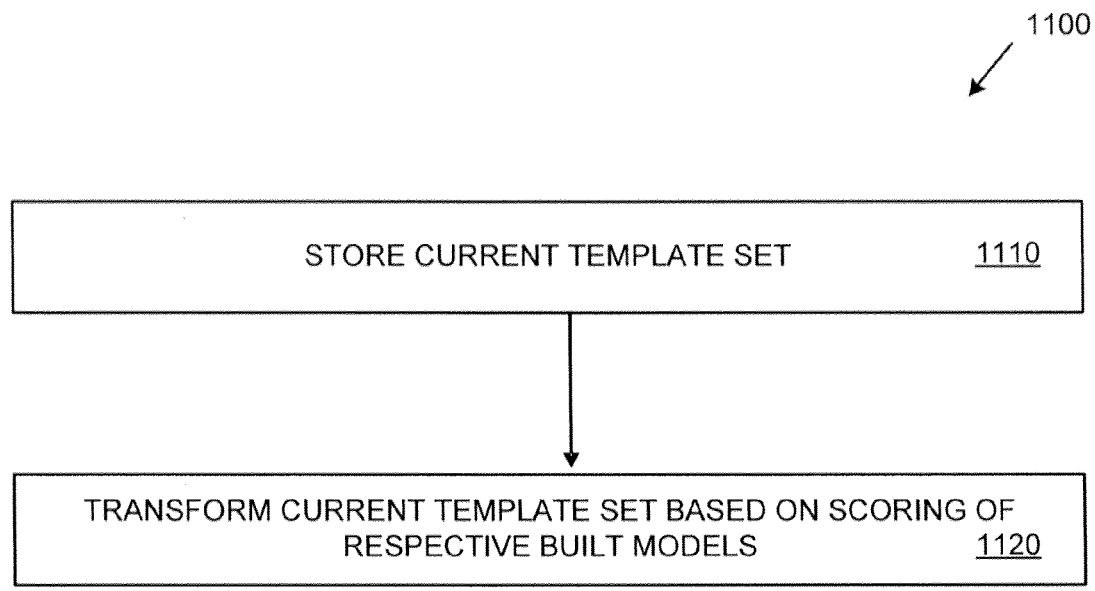
FIG. 11 is a flowchart of an exemplary method of transforming a set of predictive data mining model templates.

Exemplary Method of Transforming a Set of Predictive Data Mining Model Templates FIG. 11 is a flowchart of an exemplary method 1100 of transforming a set of predictive data mining model templates. At 1100, the current (e.g., source) set of templates is stored. At 1120, the current set is transformed based on scoring of models built for the respective templates.

Transformation can include building predictive data mining models based on templates in the set of templates and historical data, scoring the predictive data mining models based on test data and an objective function, and choosing, by software, based on the scoring, additional candidate predictive data mining model templates for inclusion in the set based on scoring results. Additional predictive models can be built and scored based on the additional candidate predictive data mining model templates.

Example 12

Exemplary Modeling System in Greater Detail

Figure 12:
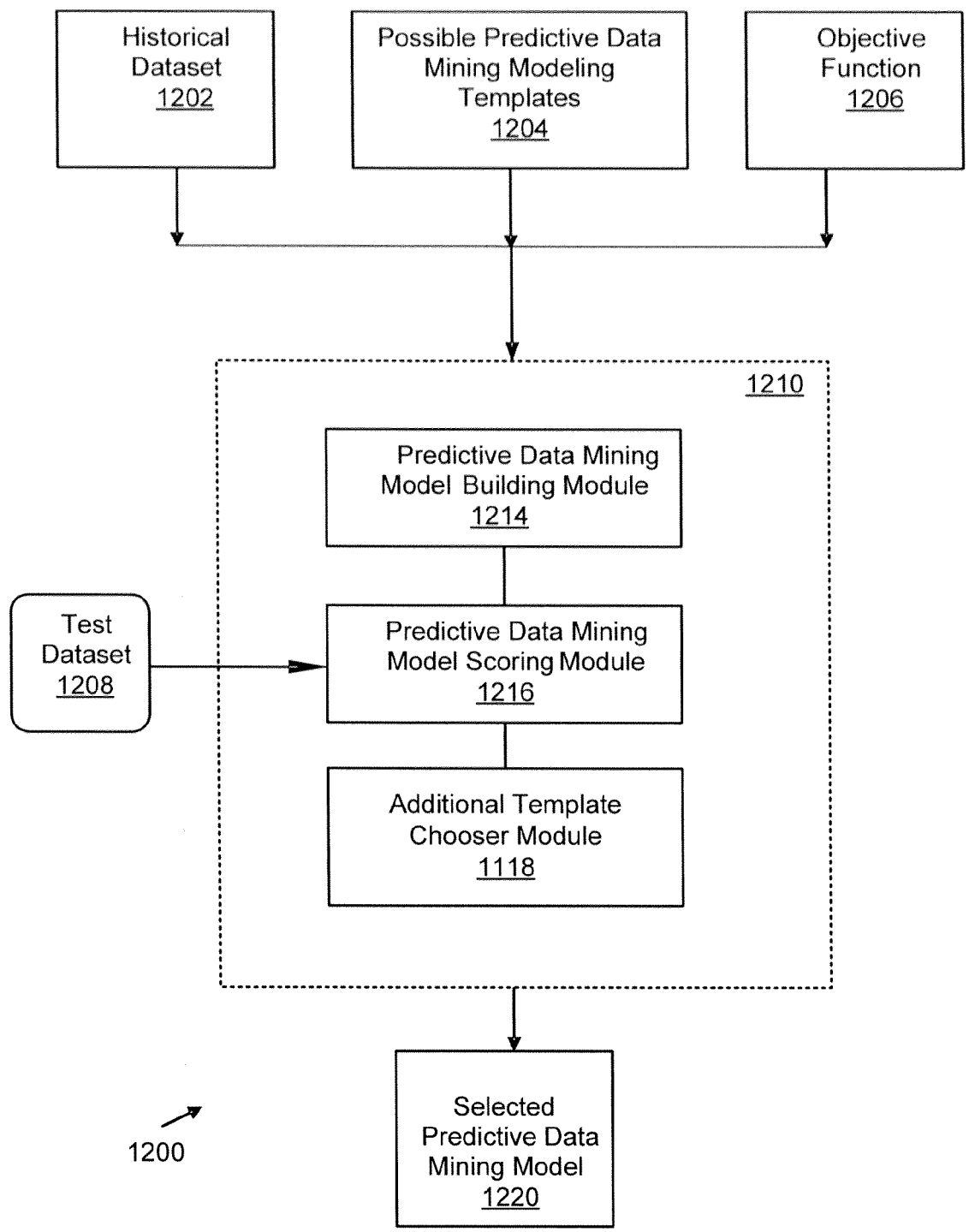
FIG. 12 is a detailed block diagram of the exemplary predictive mining modeling system of FIG. 1.

FIG. 12 is a block diagram showing the exemplary predictive data mining modeling system 100 of FIG. 1 in greater detail. In the example, the predictive data mining modeling system 1200 has three inputs: an historical dataset 1202, possible predictive data mining model templates 1204, and at least one objective function 1206. In practice, the possible data mining model templates 1204 can be represented as logic (e.g., within the model building module), and so need not be a separate input. Or, an initial set of templates (e.g., an initial or seed set) that is a subset of the possible templates can be used as input.

In the example, the three inputs 1202, 1204, 1206, as well as a test dataset 1208, are provided to a predictive data mining model selection module 1210.

In the example, a predictive data mining model building module 1214 builds a plurality of predictive data mining models based at least in part on the historical dataset 1202 and the predictive data mining model templates.

In the example, a predictive data mining model scoring module 1216 receives a test dataset 1208, applies the test dataset 1208 to the plurality of predictive data mining models, and scores the plurality of predictive data mining models based on the application of the test dataset 1208 to the plurality of predictive data mining models (e.g., in light of the objective function 1206).

In the example, an additional predictive data mining model template chooser module 1218 repeatedly chooses additional templates from the set of possible predictive data mining model templates 1204. Choosing can be based on scoring of models built from the respective templates. Additional predictive data mining models templates can be built and scored based on the additional templates.

After stopping criteria are met (e.g., after a certain number of iterations or after a certain fitness threshold has been met), the predictive data mining model selection module 1210 that selects a predictive data mining model 1220 from the plurality of predictive data mining models based at least in part on the scoring performed by the predictive data mining model scoring module 1216. An indication of the model best meeting the objective function can be stored.

In practice, the system 1200 can be more complicated, with additional inputs, outputs, and the like.

Example 13

Exemplary Optimal Model

Although the term "optimal" is sometimes used to indicate the selected model, "optimal" need not be the best possible model. It is often impossible to build and score every possible model so the best out of those scored is selected and is sometimes called "optimal."

Example 14

Exemplary Method of Predictive Data Mining Modeling

Figure 13:
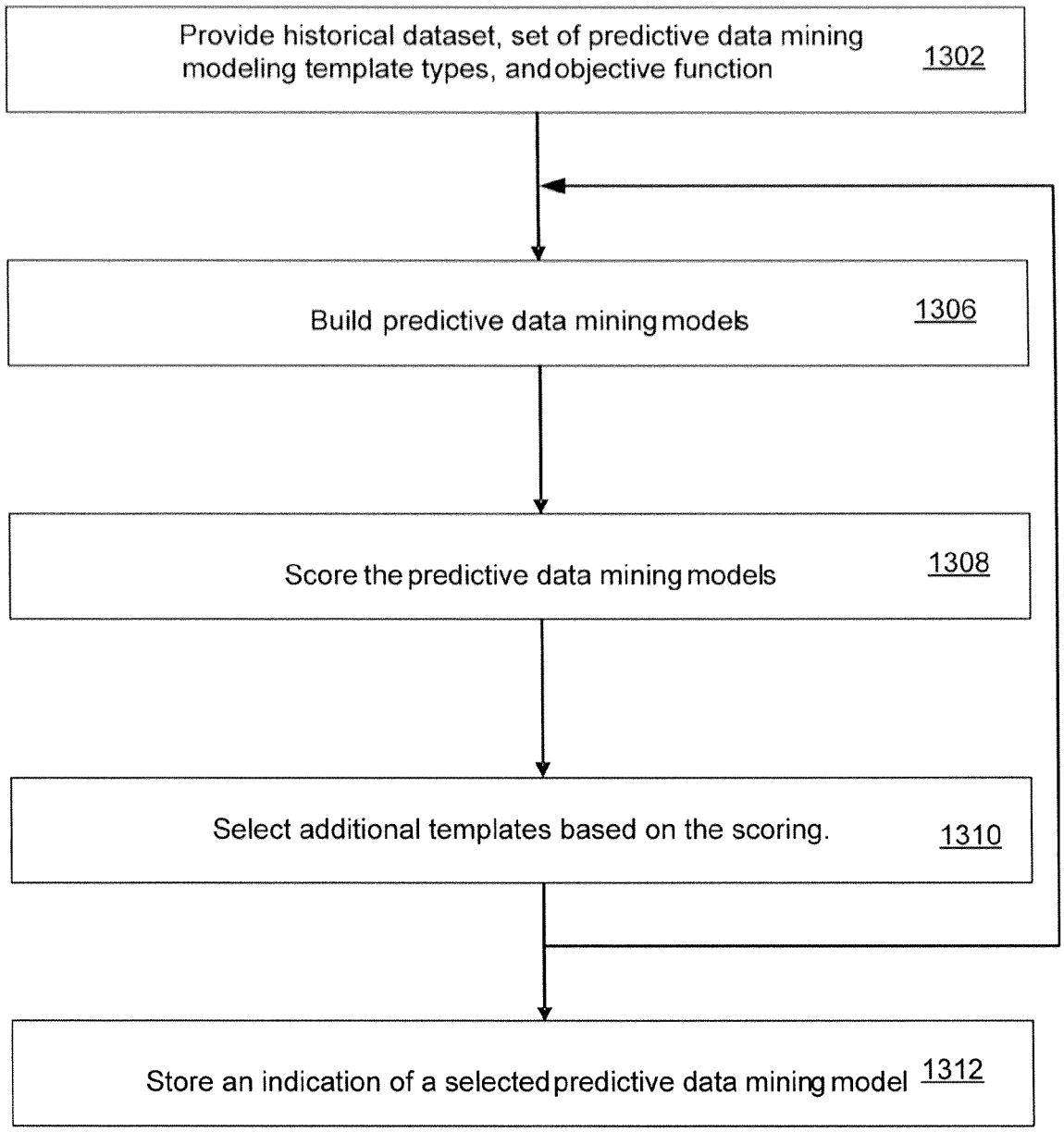
FIG. 13 is a flowchart of an exemplary method of predictive data mining modeling that can be implemented, for example, in a system such as that shown in FIG. 1 and FIG. 12.

FIG. 13 is a flowchart of an exemplary method 1300 of predictive data mining modeling.

At 1302, a historical dataset, a set of predictive data mining model templates, and an objective function are provided as inputs.

At 1306, predictive data mining models are built based at least in part on the inputted historical dataset, set of predictive data mining model templates, and objective function.

At 1308, the predictive data mining models are scored based at least in part on application of an inputted test dataset to the predictive data mining models.

At 1310, additional predictive data mining model templates for inclusion in the set of predictive data mining model templates are chosen.

The method can repeatedly performing transformation of the set of templates by performing the building, scoring, and choosing of additional templates. The additional templates can also be built and scored.

At 1312, an indication of a predictive data mining model selected based on the scoring (e.g., best meeting the objective function) is stored.

The described actions can be performed by a predictive data mining modeling system, such as that shown in FIG. 1 and FIG. 12.

Example 15

Exemplary Predictive Data Mining Modeling

Predictive modeling is one of the most-used data mining technologies and has been applied to many engineering and scientific disciplines. A typical objective of predictive data mining modeling is to a build a predictive mining model from historical data by, for example, assigning records into different classes or categories based on their attributes. A predictive mining model can be built (e.g., learns) using the historical data, the model is then used to predict membership of new records. One of the fields in the historical data can be designated as the target or class variable, while the other fields in the dataset can be referred to as independent variables (e.g., inputs or predictors).

Two techniques within predictive data mining modeling are regression and classification. The usage of these two techniques generally depends on whether the target variable is continuous or categorical. If the target variable is categorical, then the predictive data mining modeling technique to use is usually classification and, if the target variable is continuous, then the most well suited form of predictive data mining modeling technique is often regression.

There are several methods that can fall under the group of regression modeling algorithms. For example, linear regression typically fits a linear equation to a set of observed data values, whereas nonlinear regression typically extends linear regression to fit nonlinear equations. Logistic and exponential regression modeling generally attempts to fit logistic function and exponential functions respectively. Similarly, there are several methods that can fall under the group of classification modeling algorithms. The range of classification methods can include decision trees, neural networks, support-vector machines, Bayes methods, lazy learning techniques, and nearest neighbor approach, for example.

In certain implementations, a decision tree is the preferred technique for predictive data mining modeling. Some of the representative algorithms that can be used to build decision trees include ID3, C4.5, C5.0, SLIQ, CART (Classification and Regression Trees), and CHAID (Chi-square Automatic Interaction Detector). Each of these algorithms can have several tuning parameters that can be varied. For example, the J48 algorithm, which is provided in the popular open source machine learning tool Weka for generating an un-pruned or a pruned C4.5 decision tree, can have many tuning parameters. A user can set the value of a parameter called binary splits to true or false. Similarly, the user can set values for other tuning parameters such as the usage of the Laplace option or sub-tree raising.

Example 16

Exemplary Predictive Data Mining Modeling Algorithms

The various algorithms that can be used to build predictive data mining models, combined with their respective tuning parameters, can result in a very large number of ways in which a model can be built. Applying different algorithms and their tuning parameters will typically result in a large number of potentially different models having potentially different predictive accuracy, precision, and size.

Figure 14:
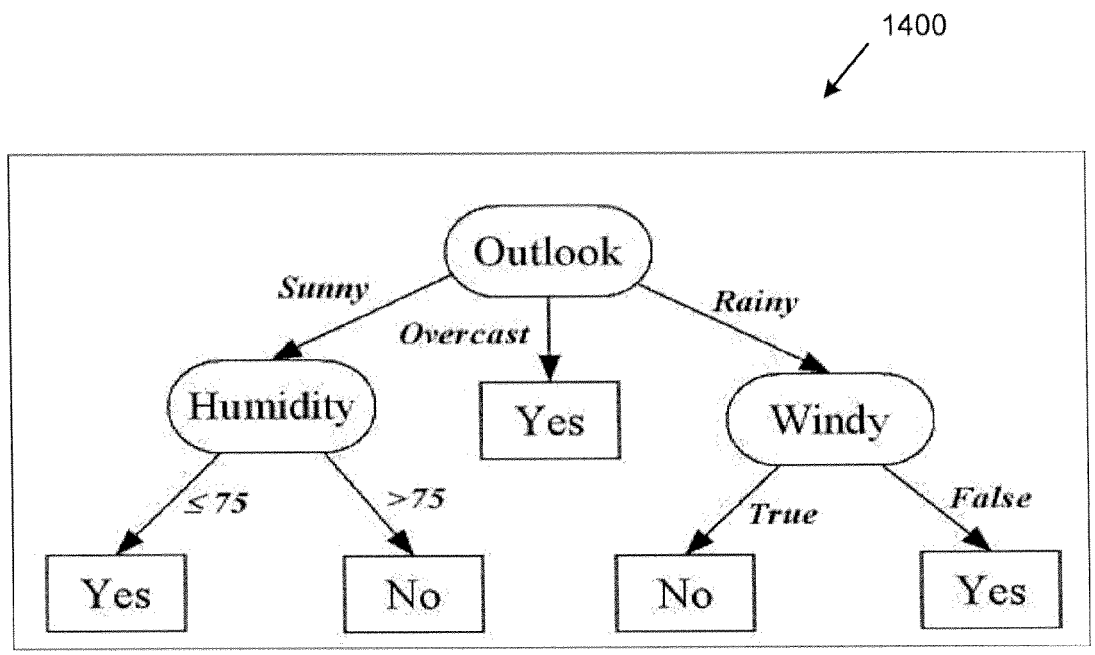
FIG. 14 is a diagram of an exemplary decision tree built using a J48 learning scheme with the value of a binary split control parameter set to false.
Figure 15:
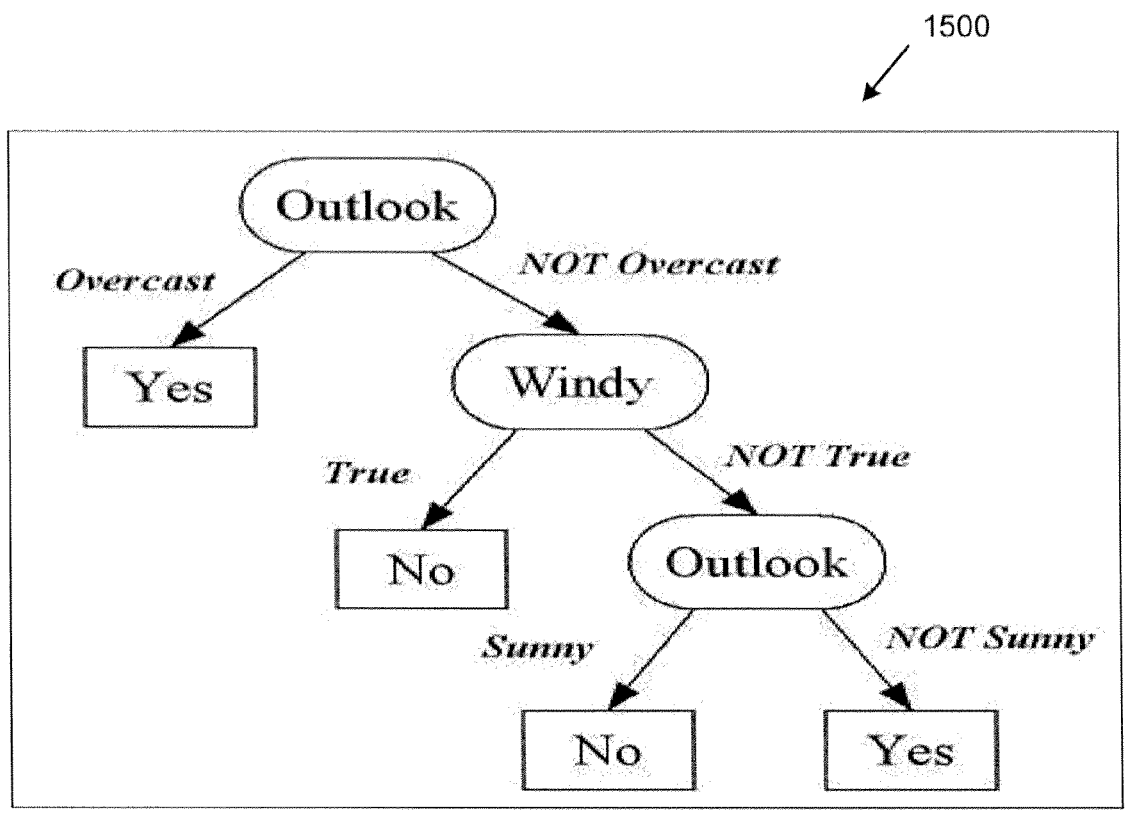
FIG. 15 is a diagram of an exemplary decision tree built using a J48 learning scheme with the value of a binary split control parameter set to true.

FIGS. 14 and 15 illustrate two different models 1400, 1500 that can be obtained by applying the J48 algorithm implemented in Weka. For the models 1400, 1500 shown in FIGS. 14 and 15, the training data is the same, and the values of all tuning parameters are the same except for the parameter binary split. For the model 1400 in FIG. 14, the value of the binary split parameter is set to false, and for the model 1500 in FIG. 15, the value of the binary split parameter is set to true. When the same test data are applied to both models 1400, 1500, the accuracy results are different.

Since the performance of an algorithm generally depends critically on the dataset, it is important to find an appropriate algorithm for a particular dataset. A fundamental and difficult question in machine learning is determining which learning algorithm will produce more accurate classifiers for a particular dataset and domain. The historical data or the input data used to build a model is typically referred to as the training set and in commercial data mining projects it is common to have the size of a training dataset in the order of millions (e.g., of cases or records). The time required to build a predictive data mining model (e.g., for example a decision tree model or a neural network model) increases with the increase in the number of training examples and the number of attributes in each record. For instance, depending on the computational resources it can take several hours to even days to build a predictive data mining model from a training dataset that contains millions of records where each record contains few hundred attributes.

Example 17

Exemplary Predictive Data Mining Model Building

In certain implementations, the process of building a predictive model is an iterative process in which different mining methods are tried and their control parameters are fine tuned to build several models. Various models obtained are evaluated by comparing them on the basis of a user-defined objective function.

There are many factors to be considered in deciding whether a model is appropriate to be deployed in an application. One of the parameters used to judge the quality of a model is the classification error which signifies the accuracy of a model in assigning class labels to new classes. Other criteria can include the size of the model (e.g., the depth of a decision tree and the number of nodes in the tree) and the misdetection rate for each of the target categories. Two models can have the same overall accuracy but may differ in their accuracy rates for individual categories.

The appropriate model to choose often depends on the nature of the problem at hand. All misclassification and/or errors may not be equally serious. For example, consider a situation in which a model is built for predicting presence of a heart disease in a patient based on his sugar level, ages genders blood pressure etc. An error committed in diagnosing a patient as healthy when the patient is in fact suffering from life-threatening heart disease (thus falsely classified as negative) is generally considered more serious than another type of error where a patient is diagnosed as suffering from a heart disease when the patient is in fact healthy (thus falsely classified as positive). If a choice is to be made between two models having the same overall error rate, the model with a lower error rate for false negative decisions may desirably be preferred to classify patients as ill or healthy. Thus, distinguishing among error types can be very important so several models can be built to decide which one is best suited.

Example 18

Exemplary Advantages

There are at least two problems that can make it computationally expensive to find optimal predictive model building parameters without using the techniques described herein. One problem is that the number of model building parameters is typically very large. The large number of parameters can make an exhaustive search infeasible. Another problem is that building a single model itself can consume a substantial amount of time in cases where the dataset contains a huge number of records and attributes.

Example 19

Exemplary Techniques

When enumeration over the entire space of solutions is not possible, heuristics like genetic algorithms and tabu search can be used to find a good solution which may not be the best solution by sacrificing completeness in return of efficiency.

Metaheuristic search algorithms such as genetic algorithms can be applied to search the space of predictive model building parameters.

The innovative technologies described herein can serve as a useful technique to find a good predictive model in a reasonable amount of time. Performance of a genetic algorithm can be measured by recording the percentage of solution space explored and the quality of the solution found.

Example 20

Exemplary Genetic Algorithms

Genetic algorithms are generally adaptive heuristic search algorithms. In certain embodiments, the problem of finding optimal predictive model building parameters can be formulated as an optimization problem. Genetic algorithms can be applied to the problem of finding optimal predictive model building parameters.

Genetic algorithms are less susceptible to getting stuck at local optima than gradient search methods. Genetic algorithms have been shown to perform well in searching through a huge number of possibilities in a search space whose structure is not well known. To carry out search by means of metaheuristic techniques such as genetic algorithms, several elements of the problem and search strategy can be defined, such as a model of the problem and a representation of possible solutions, transformation operators that are capable of changing an existing solution into an alternative solution, and a strategy for searching the space of possible solutions using the representation and transformation operators. Genetic algorithms can be used to explore the space of predictive model building parameters with the objective of finding a learning scheme and its control options that maximize the overall accuracy of the classifier. Components of genetic algorithm applications can include evaluation, selection, crossover, and mutation.

In certain implementations, genetic algorithms can be used as a component of an optimization tool that can interface with a user. In the example, the user need only specify the input data and an objective function to evaluate predictive data mining models to find an appropriate model based on the information provided by the user.

In the example, finding a suitable algorithm and fine tuning its control parameter can be done by search techniques (e.g., genetic algorithms) and not by the user. This desirably relieves the user from needing to have an in-depth knowledge of all the available algorithms. Also, a brute force approach of enumerating over all of the possible models is usually not possible because the number of possible models is very large and because it is also very time consuming to build each model.

Tools and techniques for applying genetic algorithms as an optimization tool for finding an accuracy-maximizing predictive data mining model are described herein. Genetic algorithms typically provide a good approximation technique to solve an optimization problem of finding the best learning scheme and its control options for performing predictive data mining. Such tools and techniques can be used to find good models in situations where it is computationally expensive to enumerate over all the possible models. The performance of genetic algorithm use can be measured by recording the percentage of solution space explored and the quality of the solution found.

Example 21

Exemplary Binary String Representation of Model Building Parameters

The solution and solution space can be encoded in a format such that genetic algorithms can be applied. A model building parameter can be transformed into a vector of binary variables in a form applicable to a metaheuristic search (e.g., as a stored digital chromosome). The classifier type, learning scheme, and control options to build a predictive model can be represented as a candidate solution for the metaheuristic search and the objective can be to efficiently explore the space of model building parameters and find a desirable (e.g., maximum accuracy) classifier. A candidate solution can be represented as a binary string of 0's and 1's. The size of a chromosome or a candidate solution can be set to any number of bits (e.g., ten or the like).

Figure 16:
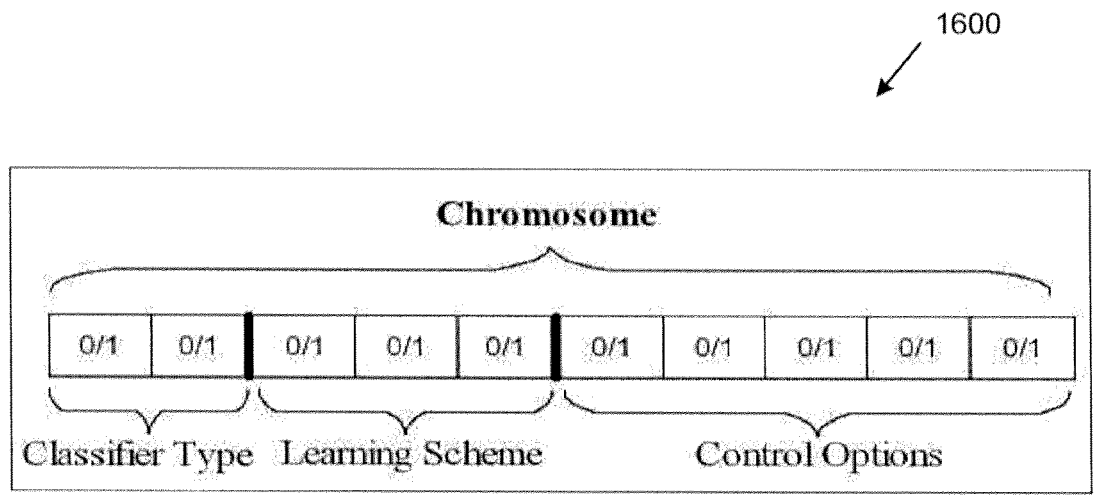
FIG. 16 is a diagram of an exemplary digital chromosome.

FIG. 16 shows a digital chromosome 1600 taking the form of a bit string. The chromosome 1600 is divided into ten genes (e.g., single bits) that can each encode a particular element of the candidate solution. As shown in FIG. 16, the first two bits of the chromosome 1600 are used to represent a classifier type.

There can be, for example, four classifier types: tree, Bayes, rules, and functions. In certain exemplary encoding schemes, if the first two bits of a chromosome are both 0 then they represent a tree classifier whereas if the first bit is 0 and the second hit is 1 then they represents a Bayes classifier. Rules and function classifiers can be represented by 10 and 11.

In the example, the next three bits of the chromosome 1600 are used to encode learning schemes within a classifier type. There are several learning schemes which fall under the category of tree based classifiers. For example, some of the decision tree inducing algorithms implemented in Weka are J48, LMT, NBTree, Random Forests, Random Tree, and REPTree. Each of these tree building algorithms can be represented by a unique string of three bits. Similar logic can follow for other classifier types.

In the example, the last five bits of the chromosome 1600 represent tuning parameters for the various algorithms. For instance, some of the tuning parameters for the JRip algorithm can include setting the values for error rate, number of optimizations, value of minimal weights, and whether to use pruning or not. Changing the values of these parameters may result in different models thereby resulting in different classification accuracies.

Figure 17:
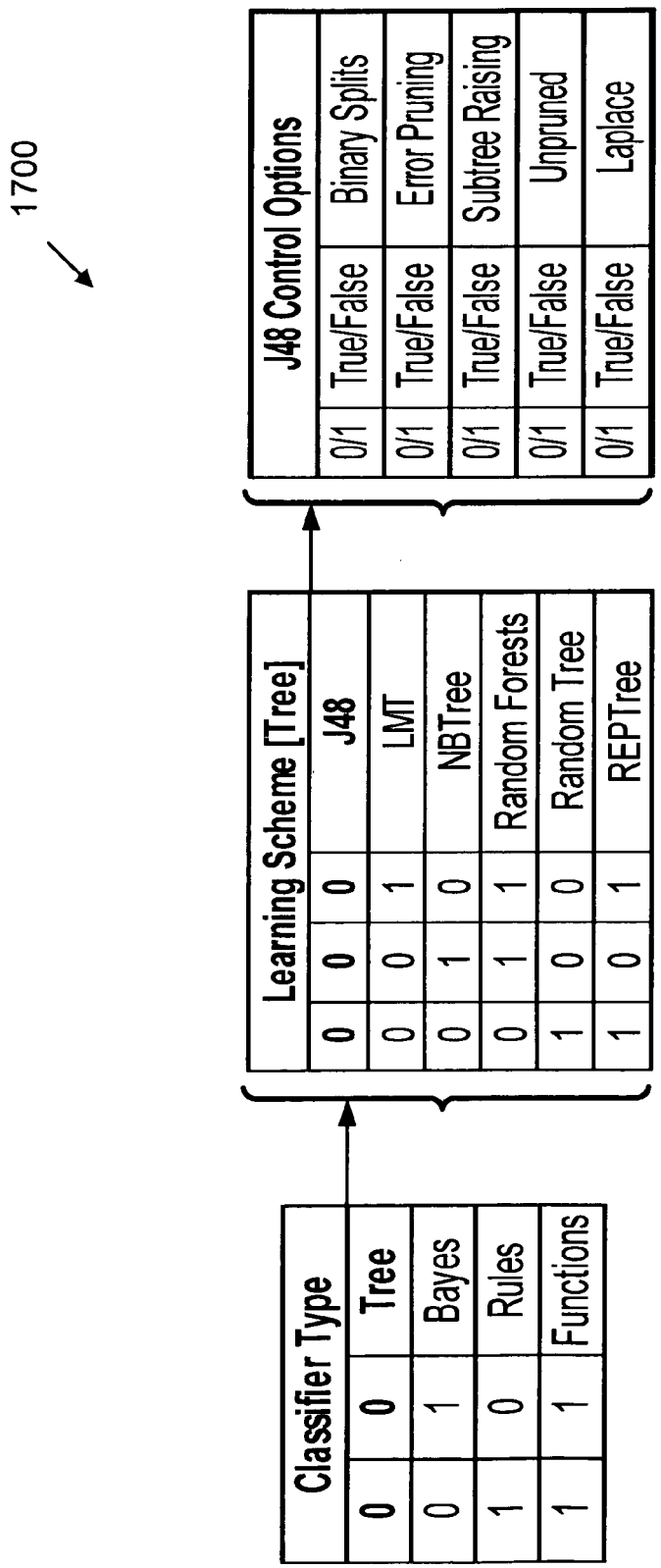
FIG. 17 is a diagram of an exemplary mapping of a ten-bit chromosome into a predictive data mining model template.

FIG. 17 illustrates how a ten bit chromosome can be mapped to a predictive model building parameter. FIG. 17 shows how a chromosome starting with 00 is translated to a tree based classifier and how the next three bits translate to a specific algorithm within a classifier type. For instance, a binary string of 0000010101 represents a J48 classifier with binary splits, using sub-tree raising and Laplace, while setting the values of error-pruning and un-pruned to off.

Example 22

Exemplary Genetic Algorithms

Genetic algorithms are typically modeled on the principles of evolution via natural selection and use a fitness function to evaluate chromosomes. The reproductive success of chromosomes can vary with fitness. The method used for computing solution fitness is typically a key component of genetic algorithms. Based on the fitness of the population, the algorithm stochastically selects individuals from the population to produce offspring via genetic operators like mutation and crossover. The accuracy of a classifier can be used as a measure of fitness. Accuracy generally refers to the percentage of correct predictions made by a predictive model over a data set. It may indicate how accurate a model's predictions are. Other metrics such as precision, recall, F-measures, and accuracy for each category can be used to judge the performance of a classifier. In certain implementations, the overall accuracy of a classifier can be the most significant measure of fitness.

Example 23

Exemplary Genetic Algorithm Selection

Genetic algorithms are generally based on the principle of survival of the fittest whereby a chromosome's probability of being selected for the next phase is proportional to its fitness. There are several selection criteria that can be employed and the intention behind such selection criterion can be to improve the overall quality of the population. Some of the selection criteria can include proportionate selection, ranking selection, and tournament selection. A key concept is that selection criterion should be such that good solutions are more likely to survive. Selection criteria can be implemented as Java classes in the JGAP (Java Genetic Algorithms Package) tool. There are various other selection methods, such as the tournament selection method provided in the JGAP tool.

Example 24

Exemplary Roulette Wheel Selection Strategy

In a roulette wheel selection strategy, chromosomes can be allocated to a section on the wheel according to its fitness function. The fittest chromosome in the population can be assigned the largest area, whereas the worst chromosome may get the smallest area on the wheel. When the selection method is invoked, the wheel can be spun (e.g., a random number selected by software) and, when the wheel stops rotating, the chromosome pointing toward the roulette needle can be selected. The wheel can be spun each time the selection method is invoked. The underlying concept is that the chromosomes with higher fitness values occupying more area on the wheel have a higher statistical probability that that they will be selected.

Example 25

Exemplary Best Chromosome Selection

Another commonly used method is that of ranking. This can include a deterministic selection strategy where the chromosomes are first sorted based according to their fitness and then the top 'n' chromosomes are chosen for the next phase. Unlike roulette wheel selection, this strategy generally does not consider all individuals for selection, but only those with a fitness value that is either higher than a given constant (also referred to as threshold selector) or if they are in the top fixed percentage of the population.

Example 26

Exemplary Crossover

Crossover in biological terms generally refers to the blending of chromosomes from the parents to generate new offspring chromosomes. Based on selection criteria, the genetic algorithm can select two chromosomes from the mating pool. Then, based on a crossover technique, splicing or crossover point(s) can be chosen in a chromosome. The two chromosomes can then be spliced and the spliced regions can be mixed to create two (e.g., potentially) new chromosomes. These child strings can inherit traits from their parents and can then be placed in the new population. In an exemplary single point crossover technique, parent genes can be swapped at one point along their length. Fixed and dynamic crossover rates can both be tested.

Example 27

Exemplary Mutation

Mutation is generally a genetic operator that can alter one or more gene values in a chromosome from an initial state, which can result in entirely new gene values being added to the gene pool. With these new gene values, the genetic algorithm may be able to arrive at a better solution than was previously possible and which is not represented in the current population. Mutation is an important part of the genetic search as it can help to prevent the population from stagnating at any local optima.

Figure 18:
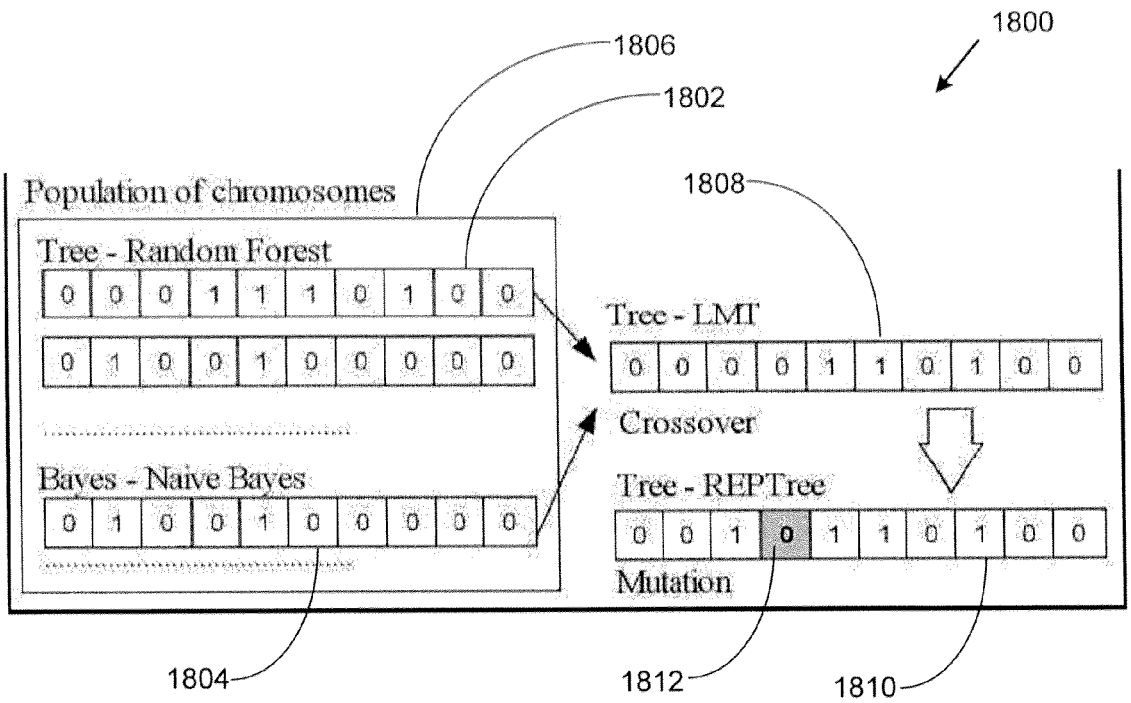
FIG. 18 is a diagram of an exemplary application of crossover and mutation functions to a population of chromosomes.

A genetic algorithm can have a mutation probability 'm' that can dictate the frequency with which mutation occurs. For each string element in each string in the mating pool, the genetic algorithm can check to see if it should perform a mutation. If it should, it can randomly change the element value to a new one. In an exemplary representation of the binary strings, 1's can be changed to 0's and 0's to 1's. Mutation can be performed after a crossover operation. FIG. 18 provides an example of selection, crossover, and mutation 1800 applied to a population of chromosomes (e.g., each encoding certain predictive data mining model building parameters). Two binary strings (chromosomes 1802, 1804) from a population of chromosomes 1806 can be selected for crossover and mutation.

In the example, the first chromosome 1802 can encode a Random Forest learning scheme and the second chromosome 1804 can encode a Naive Bayes learning scheme. The two chromosomes can be combined to produce a new chromosome 1808 that encodes a REPTree learning scheme. The new chromosome 1808 is then subjected to a mutation, resulting in an offspring chromosome 1810. In the example, the shaded cell 1812 in the offspring chromosome 1810 represents the gene that was mutated.

Example 28

Exemplary Implementations Using JGAP

In certain implementations (e.g., applying an evolutionary principle), JGAP (a genetic algorithm component written in the form of a Java package) can be used. JGAP can be used to provide Java APIs for performing genetic operators such as selection, crossover, mutation, and their variants. The fitness function can be coded as a measure of accuracy of a classifier and the chromosomes can be defined as binary string of 0's and 1's JGAP can be used to do all of the evolutionary work. Weka (a collection of machine learning algorithms implemented in Java) can be used for performing data mining tasks, Weka is. Weka APIs can be used to apply machine learning algorithms on sample datasets and can be invoked within Java code.

Example 29

Exemplary Advantageous Features

The process of building and selecting the best predictive data mining model for a particular dataset can be greatly simplified and optimized using the techniques described herein. Such tools and techniques can be used by a user (e.g., a business analyst) who may not be an expert in the use of data mining algorithms for building predictive models.

Building a predictive data mining model is typically a time consuming and iterative process that requires significant background in various mining algorithms. The tools and techniques described herein can be used, for example, by an analyst who has an understanding of the business problem, but is not necessarily familiar with mining algorithms. Models can be chosen and evaluated by software; the best model out of those chosen can be selected.

Example 30

Exemplary Alternative Applications

Various genetic algorithm parameters can be tuned to affect performance gains. Another possibility is to add one more dimension to the search space. Along with the classifier types, learning scheme and control options, the dimension of finding the best subset of attributes or features from a dataset using search techniques can be included.

Example 31

Exemplary Problem Domains

The techniques described herein can be applied to a variety of problem domains. For example, applications to the field of medicine (e.g., predicting a medical condition, disease or outcome), weather prediction, insurance (e.g., predicting an accident rate or claim value), retail (e.g., predicting the likelihood of a customer buying a certain product), banking (e.g., predicting the probability of a customer defaulting a loan), human resource management (e.g., predicting employee turnover or attrition), agriculture (e.g., classifying crop sample into pre-defined categories based on attributes), manufacturing (e.g., predicting the probability of a certain defect occurring in a product such as an air-conditioning system in an automobile) or like can be implemented.

Example 32

Exemplary Users

In any of the examples herein, a user can be any person interacting with the system via, for example, a human-computer interface.

Example 33

Exemplary Tuning Parameters and Default Values for a Decision Tree Predictive Data Mining Model Template Listed below in Table 1 are exemplary tuning parameters and default values for a decision tree predictive data mining model template.

TABLE 1

| Algorithm | Tuning Parameters | |
|---|---|---|
| | Parameter | Default Values |
| ADTree | numOfBoostingIterations | 10 |
| | randomSeed | 0 |
| | saveInstanceData | False |
| | searchPath | Expand all paths |
| DecisionStump | — | — |
| ID3 | — | — |
| J48 | binarySplits | False |
| | confidenceFactor | 0.25 |
| | minNumObj | 2 |
| | numFolds | 3 |
| | reduceErrorPruning | False |
| | saveInstanceData | False |
| | seed | 1 |
| | subTreeRaising | True |
| | unpruned | False |
| | useLaplace | False |
| LMT | convertNominal | False |
| | errorOnProbabilities | False |
| | fastRegression | True |
| | minNumInstances | 15 |
| | numBoostingIterations | −1 |
| | splitOnResiduals | False |
| M5P | buildRegressionTree | False |
| | minNumInstances | 4.0 |
| | saveInstances | False |
| | unpruned | False |
| | useUnsmoothed | False |
| NBTree | — | — |
| RandomForest | numFeatures | 0 |
| | numTrees | 10 |
| | seed | 1 |
| RandomTree | KValue | 1 |
| | minNum | 1.0 |
| | seed | 1 |
| REPTree | maxDepth | −1 |
| | minNum | 2.0 |
| | minVarianceProp | 0.0010 |
| | noPruning | False |
| | numFolds | 3 |
| | seed | 1 |
| UserClassifier | — | — |

Example 34

Exemplary Learning Scheme and Control Options for a Rule Classifier Predictive Data Mining Model Template Listed below in Table 2 are exemplary learning schemes and control options for a rule classifier predictive data mining model template.

TABLE 2

| Learning Scheme | Control Options |
|---|---|
| ConjunctiveRule | MinNo |
|  | Exclusive |
| DecisionTable | MaxStale |
|  | UseIBk |
| JRip | MinNo |
|  | UsePruning |
|  | Optimizations |
|  | CheckErrorRate |

Example 35

Exemplary Predictive Accuracies for Certain Predictive Data Mining Model Templates Listed below in Table 3 are exemplary predictive accuracies for certain predictive data mining model templates for a particular set of historical data.

TABLE 3

| Classifier | Accuracy |
|---|---|
| Bayes | |
| AODE | 91.3194 |
| BayesNet | 86.0532 |
| ComplementNaiveBayes | — |
| NaiveBayes | 86.0532 |
| NaiveBayesMultinomial | — |
| NaiveBayesSimple | 86.0532 |
| NaiveBayesUpdateable | 86.0532 |
| Functions | |
| LeastMedSq | — |
| LinearRegression | — |
| Logistic | 93.3449 |
| MultilayerPerceptron | 98.6690 |
| PaceRegression | — |
| RBFNetwork | 87.7894 |
| SimpleLinearRegression | — |
| SimpleLogistic | 93.0556 |
| SMO | 93.0556 |
| SOMreg | — |
| VotedPerceptron | — |
| Winnow | — |
| Lazy | |
| IB1 | 77.3148 |
| IBk | 92.2454 |
| KStar | 88.0787 |
| LBR | 92.8241 |
| LWL | 70.0231 |
| Meta | |
| AdaBoostM1 | 70.0231 |
| AdditiveRegression | — |
| AttributeSelectedClassifier | 90.9722 |
| Bagging | 90.8565 |
| ClassificationViaRegression | 95.5440 |
| CostSensitiveClassifier | — |
| CVParameterSelection | 70.0231 |

TABLE 3-continued

| Classifier | Accuracy |
|---|---|
| Decorate | 92.3032 |
| FilteredClassifier | 90.9722 |
| Grading | 70.0231 |
| LogitBoost | 87.3264 |
| MetaCost | — |
| MultiBoostAB | 70.0231 |
| MultiClassClassifier | 89.6412 |
| MultiScheme | 70.0231 |
| OrdinalClassClassifier | 90.7986 |
| RacedIncrementalLogitBoost | 70.0231 |
| RandomCommittee | 89.0625 |
| RegressionByDiscretization | — |
| Stacking | 70.0231 |
| StackingC | 70.0231 |
| ThresholdSelector | — |
| Vote | 70.0231 |
| Trees | |
| ADTree | — |
| DecisionStump | 70.0231 |
| ID3 | 88.8310 |
| J48 | 90.9722 |
| LMT | 97.2801 |
| M5P | — |
| NBTree | 93.6921 |
| RandomForest | 92.0131 |
| RandomTree | 69.9074 |
| REPTree | 88.4259 |
| UserClassifier | — |
| Rules | |
| ConjunctiveRule | 70.0231 |
| DecisionTable | 92.5347 |
| JRip | 86.4005 |
| M5Rules | — |
| NNge | 93.8657 |
| OneR | 70.0231 |
| PART | 94.6759 |
| Prism | 89.6412 |
| Rider | 95.081 |
| ZeroR | 70.0231 |

Example 36

Exemplary Computing Environment

Figure 19:
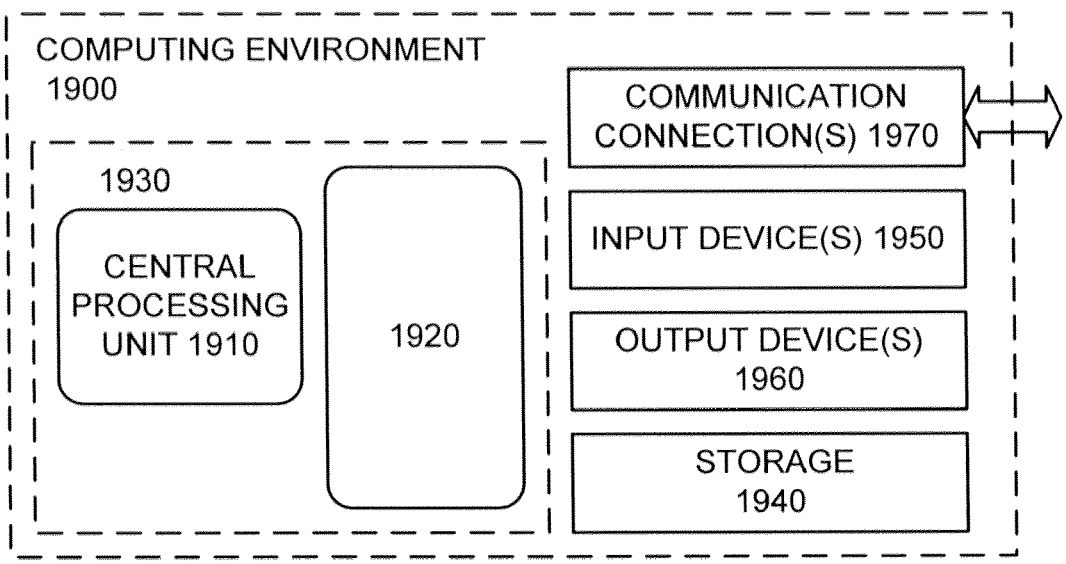
FIG. 19 is a block diagram of an exemplary suitable computing environment for implementing any of the technologies described herein.

FIG. 19 illustrates a generalized example of a suitable computing environment 1900 in which the described techniques can be implemented. For example, computing devices (e.g., physical machines) described herein can be configured as shown in the environment 1900. The computing environment 1900 is not intended to suggest any limitation as to scope of use or functionality, as the technologies can be implemented in diverse general-purpose or special-purpose computing environments. Mobile computing devices can similarly be considered a computing environment and can include computer-readable media. A mainframe environment can be different from that shown, but can also implement the technologies and can also have computer-readable media one or more processors, and the like.

With reference to FIG. 19, the computing environment 1900 includes at least one processing unit 1910 and memory 1920. In FIG. 19, this basic configuration 1930 is included within a dashed line. The processing unit 1910 executes computer-executable instructions and can be a real or a virtual processor. In a multi-processing system, multiple processing units execute computer-executable instructions to increase processing power. The memory 1920 can be volatile memory (e.g., registers, cache, RAM), non-volatile memory (e.g., ROM, EEPROM, flash memory, etc.), or some combination of the two. The memory 1920 can store software implementing any of the technologies described herein.

A computing environment can have additional features. For example, the computing environment 1900 includes storage 1940, one or more input devices 1950, one or more output devices 1960, and one or more communication connections 1970. An interconnection mechanism (not shown) such as a bus, controller, or network interconnects the components of the computing environment 1900. Typically, operating system software (not shown) provides an operating environment for other software executing in the computing environment 1900, and coordinates activities of the components of the computing environment 1900.

The storage 1940 can be removable or non-removable, and includes magnetic disks, magnetic tapes or cassettes, CD-ROMs, DVDs, or any other computer-readable media which can be used to store information and which can be accessed within the computing environment 1900. The storage 1940 can store software containing instructions for any of the technologies described herein.

The input device(s) 1950 can be a touch input device such as a keyboard, keypad, touch screen, mouse, pen, or trackball, a voice input device, a scanning device, or another device that provides input to the computing environment 1900. For audio, the input device(s) 1950 can be a sound card or similar device that accepts audio input in analog or digital form, or a CD-ROM reader that provides audio samples to the computing environment. The output device(s) 1960 can be a display, printer, speaker, CD-writer, or another device that provides output from the computing environment 1900.

The communication connection(s) 1970 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing environment.

Methods in Computer-Readable Media

Any of the methods described herein can be implemented by computer-executable instructions in one or more computer-readable media (e.g., computer-readable storage media, other tangible media, or the like). Such computer-executable instructions can cause a computer to perform the described method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of these claims.

I claim:

1. A computer-implemented method comprising:
receiving a set of candidate predictive data mining model templates;
repeatedly transforming the set of candidate predictive data mining model templates, wherein the transforming comprises building predictive data mining models based on templates in the set and historical data, scoring the predictive data mining models based on test data and an objective function, and choosing, by software, based on the scoring, additional candidate predictive data mining model templates for inclusion in the set based on scoring results;
building and scoring additional predictive data mining models based on the additional candidate predictive data mining model templates; and
storing an indication of a candidate predictive data mining model template for which a built and scored predictive data mining model best meets the objective function;
wherein at least one of the set of candidate predictive data mining model templates is represented at least in part by a stored digital chromosome according to a genetic algorithm; and
transforming the set of candidate predictive data mining model templates comprises selecting a chromosome via a roulette wheel chromosome selection strategy.

2. The computer-implemented method of claim 1 wherein:
building a predictive data mining model for a respective template comprises building a predictive data mining model having characteristics indicated by the stored digital chromosome for the respective template; and
the transforming comprises applying the genetic algorithm.

3. The computer-implemented method of claim 2 wherein:
at least one stored digital chromosome comprises an indication of one of a plurality of predictive data mining modeling classifier types; and
building a predictive data mining model for a respective template comprises building a predictive data mining model of a classifier type indicated by the stored digital chromosome for the respective template.

4. The computer-implemented method of claim 2 wherein:
at least one stored digital chromosome comprises an indication of one of a plurality of predictive data mining modeling learning schemes; and building a predictive data mining model for a respective template comprises building a predictive data mining model via a learning scheme indicated by the stored digital chromosome for the respective template.

5. The computer-implemented method of claim 2 wherein the method further comprises:
performing a chromosome crossover function for at least two chromosomes representing different predictive data mining model templates, whereby a third chromosome is generated representing a third predictive data mining model template.

6. The computer-implemented method of claim 2 wherein the method further comprises:
performing a chromosome mutation function for at least one chromosome representing a predictive data mining model template.

7. The computer-implemented method of claim 1 wherein the transforming comprises:
applying a genetic algorithm to the set of candidate predictive data mining model templates in light of how well respective models built therefor meet the objective function.

8. The computer-implemented method of claim 7 wherein:
predictive data mining model templates are represented by respective stored digital chromosomes.

9. The computer-implemented method of claim 1 wherein:
the stored digital chromosome comprises a parameter designating a predictive data mining modeling classification method selected from a set of predictive data mining modeling classification methods.

10. The computer-implemented method of claim 1 wherein:
the stored digital chromosome comprises a parameter designating a predictive data mining modeling learning scheme selected from a set of predictive data mining modeling learning schemes.

11. The computer-implemented method of claim 10 wherein the predictive data mining modeling learning scheme indicated comprises a decision tree predictive data mining modeling learning scheme or a J48 decision tree predictive data mining modeling learning scheme.

12. The computer-implemented method of claim 1 wherein:
the stored digital chromosome comprises a parameter designating a predictive data mining modeling learning scheme control option selected from a set of predictive data mining modeling learning scheme control options.

13. The computer-implemented method of claim 12 wherein
the predictive data mining modeling learning scheme control option represented comprises a binary split predictive data mining modeling learning scheme control option.

14. The computer-implemented method of claim 13 wherein the stored digital chromosome further comprises a parameter designating a pruning predictive data mining modeling learning scheme control option.

15. The computer-implemented method of claim 1 further comprising:
storing the stored digital chromosome on one or more computer-readable media, wherein the stored digital chromosome comprises:
a first field indicating a classifier type of an associated predictive data mining model;
a second field indicating a learning scheme of the associated predictive data mining model; and
a third field indicating control options for the associated predictive data mining model.

16. One or more computer-readable non-transitory media comprising computer-executable instructions causing a computer to perform a computer-implemented method comprising:
receiving a set of candidate predictive data mining model templates;
repeatedly transforming the set of candidate predictive data mining model templates, wherein the transforming comprises building predictive data mining models based on templates in the set and historical data, scoring the predictive data mining models based on test data and an objective function, and choosing, by software, based on the scoring, additional candidate predictive data mining model templates for inclusion in the set based on scoring results;
building and scoring additional predictive data mining models based on the additional candidate predictive data mining model templates; and
storing an indication of a candidate predictive data mining model template for which a built and scored predictive data mining model best meets the objective function;
wherein at least one of the set of candidate predictive data mining model templates is represented at least in part by a stored digital chromosome according to a genetic algorithm; and
transforming the set of candidate predictive data mining model templates comprises selecting a chromosome via a roulette wheel chromosome selection strategy.

17. The one or more computer-readable media of claim 16 wherein the transforming comprises:
applying a genetic algorithm to the set of candidate predictive data mining model templates in light of how well respective models built therefor meet the objective function.

18. The one or more computer-readable media of claim 17 wherein transforming the set of candidate predictive data mining model templates comprises performing a chromosome crossover function and a chromosome mutation function.

19. The one or more computer-readable media of claim 17 wherein transforming the set of candidate predictive data mining model templates comprises selecting a chromosome via a deterministic chromosome selection strategy based on a fitness ranking.

20. The one or more computer-readable media of claim 16 further comprising outputting the predictive data mining model best meeting the objective function.

21. A computer system comprising:
one or more processors; and
memory coupled to the one or more processors, wherein the memory has encoded therein computer-executable instructions causing the one or more processors to perform a computer-implemented method comprising:
receiving a set of candidate predictive data mining model templates;
repeatedly transforming the set of candidate predictive data mining model templates, wherein the transforming comprises building predictive data mining models based on templates in the set and historical data, scoring the predictive data mining models based on test data and an objective function, and choosing, by software, based on the scoring, additional candidate predictive data mining model templates for inclusion in the set based on scoring results;

building and scoring additional predictive data mining models based on the additional candidate predictive data mining model templates; and storing an indication of a candidate predictive data mining model template for which a built and scored predictive data mining model best meets the objective function;

wherein at least one of the set of predictive data mining model templates is represented at least in part by a stored digital chromosome according to a genetic algorithm; and transforming the set of candidate predictive data mining model templates comprises selecting a chromosome via a roulette wheel chromosome selection strategy.

* * * * *

UNITED STATES PATENT AND TRADEMARK OFFICE
CERTIFICATE OF CORRECTION

| | | |
|---|---|---|
| PATENT NO. | : 7,801,836 B2 | |
| APPLICATION NO. | : 11/862147 | |
| DATED | : September 21, 2010 | |
| INVENTOR(S) | : Sureka | |

It is certified that error appears in the above-identified patent and that said Letters Patent is hereby corrected as shown below:

Column 8, lines 32-33, "ages genders blood" should read --age, gender, blood--.

Column 10, line 33, "hit" should read --bit--.

Column 16, line 57, "media one" should read --media, one--.

Signed and Sealed this
Twelfth Day of July, 2011

David J. Kappos
*Director of the United States Patent and Trademark Office*